(12) United States Patent
Anno

(10) Patent No.: US 8,316,053 B2
(45) Date of Patent: Nov. 20, 2012

(54) INFORMATION PROCESSING APPARATUS AND INFORMATION PROCESSING METHOD

(75) Inventor: Makoto Anno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 12/502,880

(22) Filed: Jul. 14, 2009

(65) Prior Publication Data

US 2010/0017435 A1    Jan. 21, 2010

(30) Foreign Application Priority Data

Jul. 18, 2008    (JP) ............................... 2008-187118

(51) Int. Cl.
*G06F 7/00*    (2006.01)
*G06F 17/30*    (2006.01)

(52) U.S. Cl. ........................................ 707/784

(58) Field of Classification Search .............. 707/695, 707/899, 955, 962, 781
See application file for complete search history.

(56) References Cited

U.S. PATENT DOCUMENTS

| | | | |
|---|---|---|---|
| 2003/0079177 A1* | 4/2003 | Brintzenhofe et al. | 715/500 |
| 2006/0156227 A1 | 7/2006 | Hosotsubo | |
| 2006/0259524 A1* | 11/2006 | Horton | 707/201 |
| 2007/0240203 A1* | 10/2007 | Beck | 726/4 |
| 2008/0065675 A1* | 3/2008 | Bozich et al. | 707/102 |

FOREIGN PATENT DOCUMENTS

JP    2006-171979 A    6/2006

* cited by examiner

*Primary Examiner* — Van Oberly

(74) *Attorney, Agent, or Firm* — Canon USA Inc. IP Division

(57) ABSTRACT

A document management apparatus performs a first process to delete an object that is not to be presented to a user from document information registered in a database. The document management apparatus then performs a second process to determine whether a vacant block created as a result of the deleting of the object can be filled with another object. If it is determined by a CPU of the document management apparatus that a proper object to be put in the vacant block is not found, a third process is performed to adjust a layout associated with the vacant block. The document management apparatus then performs a forth process to provide a preview of a document with an adjusted layout thereby allowing a user to confirm the adjustment.

11 Claims, 9 Drawing Sheets

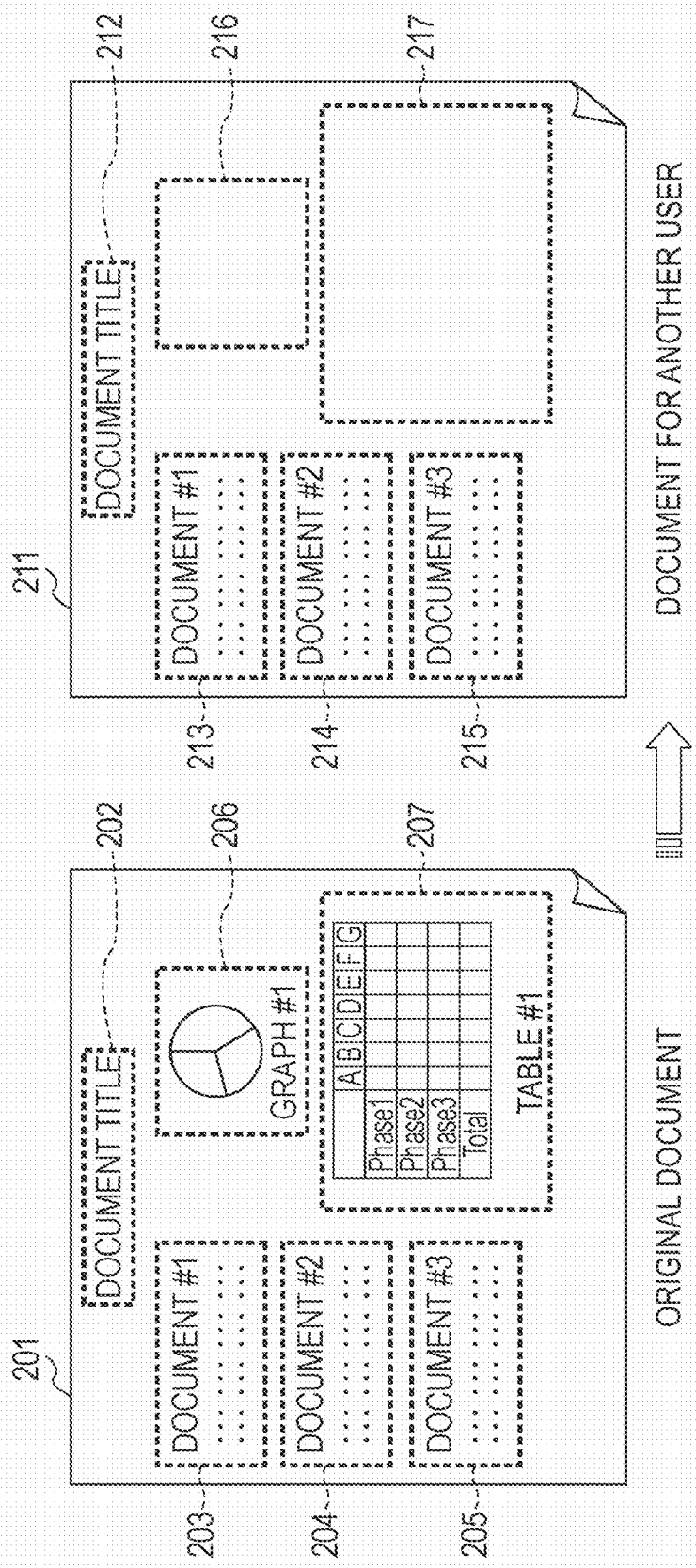

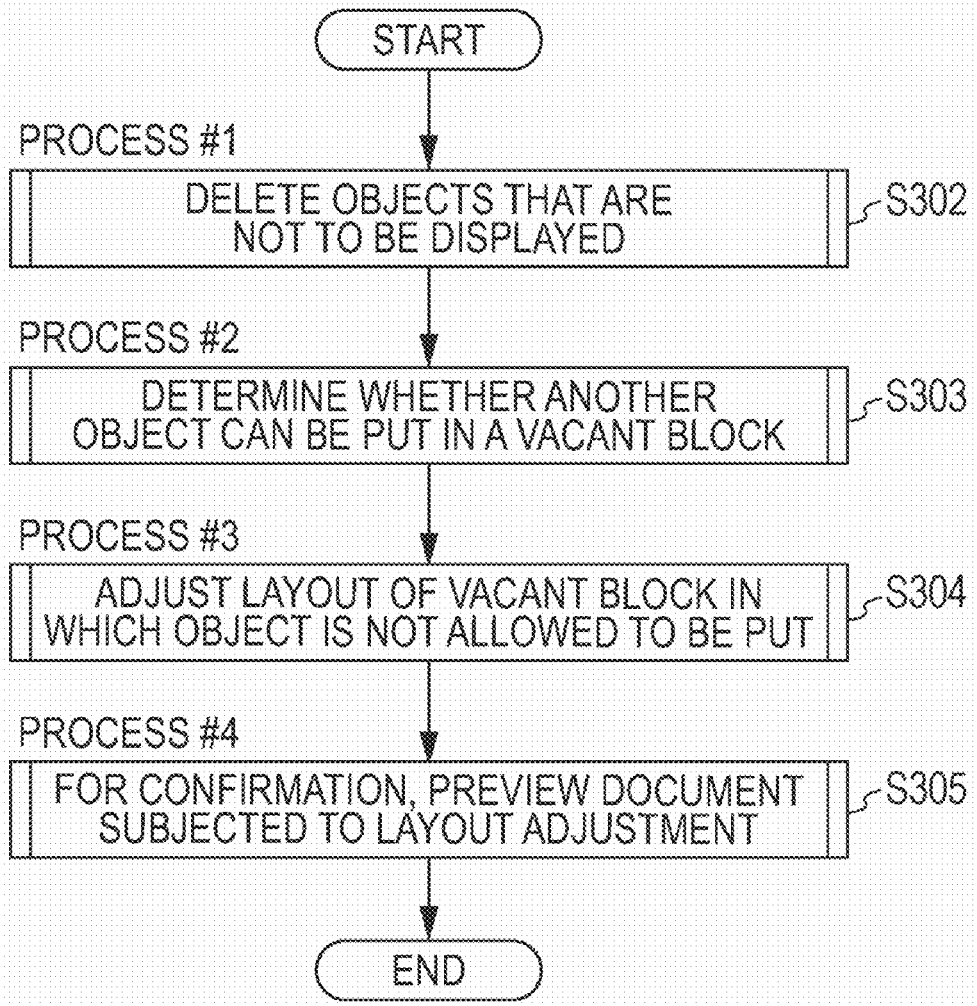

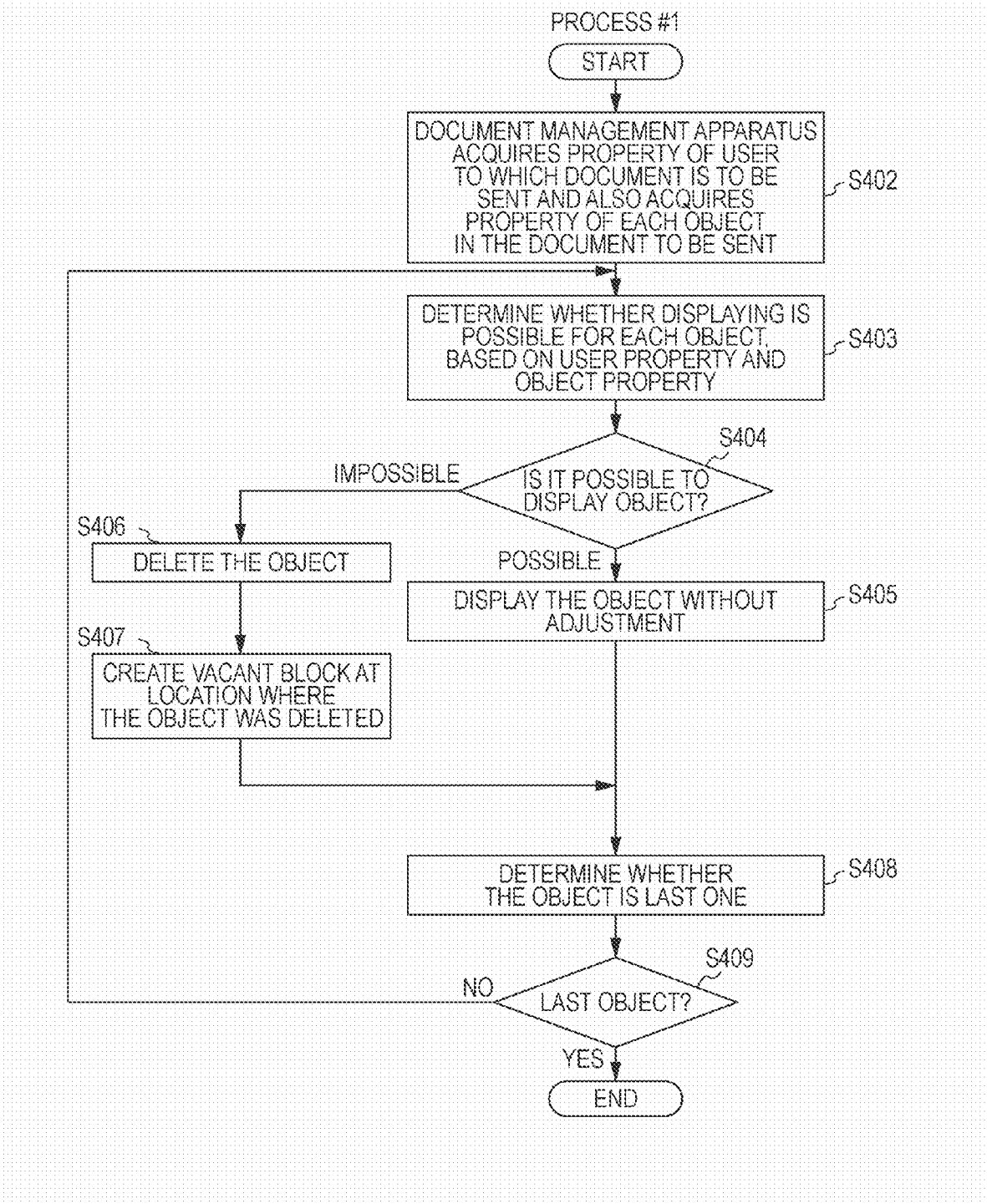

FIG. 7

PROCESS #4
START

↓

DISPLAY DOCUMENT FOR PREVIEW IN A FORM THAT ALLOWS A USER TO EDIT THE DOCUMENT — S702

↓

WAIT FOR THE USER TO INPUT APPROVAL COMMAND — S703

↓

S704 INPUT?
NO → (loop back)
YES ↓

SET THE PRESENT DOCUMENT LAYOUT AS A FINAL LAYOUT — S705

↓

END

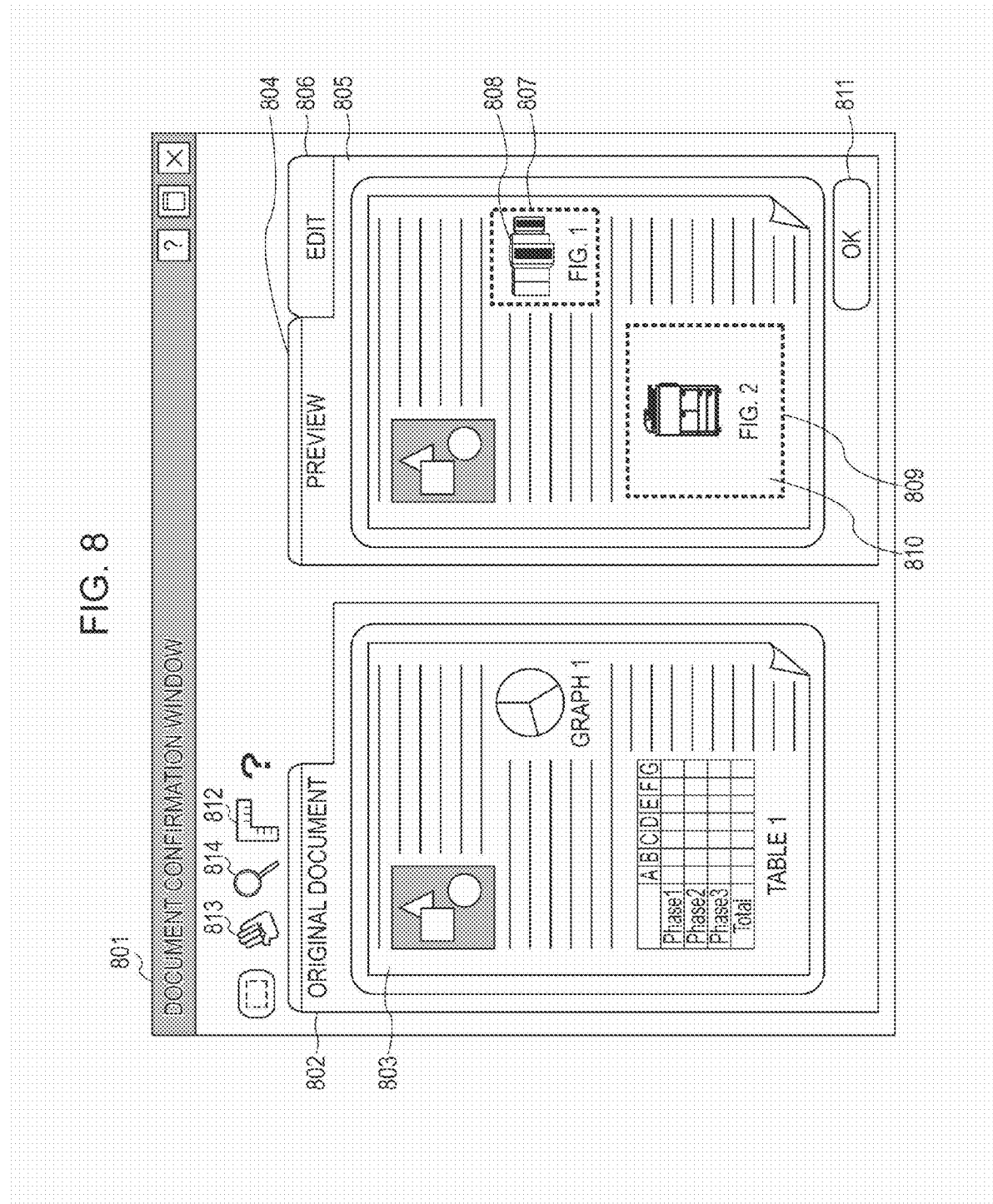

FIG. 9

| STORAGE MEDIUM SUCH AS FD OR CD-ROM |
|---|
| DIRECTORY INFORMATION |
| FIRST PROCESSING PROGRAM<br>SET OF PROGRAM CODES CORRESPONDING<br>TO STEPS IN FLOW CHART SHOWN IN FIG. 3 |
| SECOND PROCESSING PROGRAM<br>SET OF PROGRAM CODES CORRESPONDING<br>TO STEPS IN FLOW CHART SHOWN IN FIG. 4 |
| THIRD PROCESSING PROGRAM<br>SET OF PROGRAM CODES CORRESPONDING<br>TO STEPS IN FLOW CHART SHOWN IN FIG. 5 |
| FOURTH PROCESSING PROGRAM<br>SET OF PROGRAM CODES CORRESPONDING<br>TO STEPS IN FLOW CHART SHOWN IN FIG. 6 |
| FIFTH PROCESSING PROGRAM<br>SET OF PROGRAM CODES CORRESPONDING<br>TO STEPS IN FLOW CHART SHOWN IN FIG. 7 |

INFORMATION PROCESSING APPARATUS AND INFORMATION PROCESSING METHOD

CROSS REFERENCE TO RELATED APPLICATION

This application claims the benefit of Japanese Patent Application No. 2008-187118 filed Jul. 18, 2008, which is hereby incorporated by reference herein in its entirety.

BACKGROUND OF THE INVENTION

1. Field of the Invention

The present invention relates to a process of searching for an object performed by an information processing apparatus configured to manage document information.

2. Description of the Related Art

A document information management system is known that is capable of storing a large number of pieces of document information in a storage device and allowing a large number of users to access document information via a terminal device and to edit the document information by operating the terminal device.

In such a system, the right to access or edit document information stored in the storage device is controlled separately for each user.

In such a system, there is a need to modify document information stored in the storage device so that contents of document information disclosed to users are changed depending on users.

For example, employees (users) in a sales section are allowed to access information in terms of sales or profit, but employees (users) in other sections are not allowed.

Another example of access control is that numeric data associated with management of a company is allowed to be accessed by managers or executives but is not allowed for other general employees.

In a technique disclosed in Japanese Patent Laid-Open No. 2006-171979, when a page of document information including a plurality of pages is displayed, if the page has a blank area, then a sentence or a figure present in a following page is automatically moved up into the blank area, and a resultant rearranged page is displayed.

In the technique disclosed in Japanese Patent Laid-Open No. 2006-171979, the layout is controlled by using links between containers into which sentences, figures, etc. flow.

To provide capabilities such as those described above desired by users, it is necessary to control displaying of parts of document information (hereinafter, such parts of document information will be referred to as objects) stored in the storage device, depending on user properties. However, if a particular object in document information is not displayed, a non-displayed area (blank area) is created, and this can cause resultant document information including the blank area to have an unattractive layout.

In the technique disclosed in Japanese Patent Laid-Open No. 2006-171979, when a particular container is vacant, the layout is automatically changed such that this container is reduced and containers located before and after the vacant container are connected together.

When the layout is adjusted in terms of a blank area created as a result of deleting an object, if the layout adjustment is performed taking into account the consistency of meanings of objects, then the resultant document information provided to users can be more useful.

SUMMARY OF THE INVENTION

In view of the above, the present invention provides a technique of searching for an object, putting a detected object in a blank area created as a result of deleting an object from an original document, and presenting resultant document information having a consistent meaning to a user.

More specifically, the present invention provides an information processing apparatus including a management unit configured to acquire a property of a partial area included in document information and manage the partial area in connection with the property as an object, an acquisition unit configured to acquire a user property of a user accessing the document information, a deleting unit configured to compare the user property acquired by the acquisition unit with the property of the object managed by the management unit and delete, from the document information, an object that is not allowed to be accessed by a user having the user property, a search unit configured to search for an object with which to replace the object deleted by the deleting unit, based on properties of objects present in the neighborhood of the object in the document information managed by the management unit, and an adjustment unit configured to adjust a layout of the document information such that if an object with which to replace the object deleted by the deleting unit is retrieved by the search unit, the adjustment unit adjusts the layout of the document information using the retrieved object.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram illustrating a manner in which a document editing process is performed by an information processing apparatus according to an embodiment of the present invention.

FIG. 3 is a flow chart illustrating an example of a data processing procedure performed by an information processing apparatus according to an embodiment of the present invention.

FIG. 4 is a flow chart illustrating an example of a data processing procedure performed by an information processing apparatus according to an embodiment of the present invention.

FIG. 7 is a flow chart illustrating an example of a data processing procedure performed by an information processing apparatus according to an embodiment of the present invention.

FIG. 8 is a diagram illustrating an example of a user interface displayed on a display of a client PC.

FIG. 9 is a diagram illustrating a memory map of a storage medium that stores various data processing programs readable by a document management apparatus according to an embodiment of the present invention.

DESCRIPTION OF THE EMBODIMENTS

Embodiments of the present invention are described below with reference to accompanying drawings.

First Embodiment

System Configuration

Figure 1A:
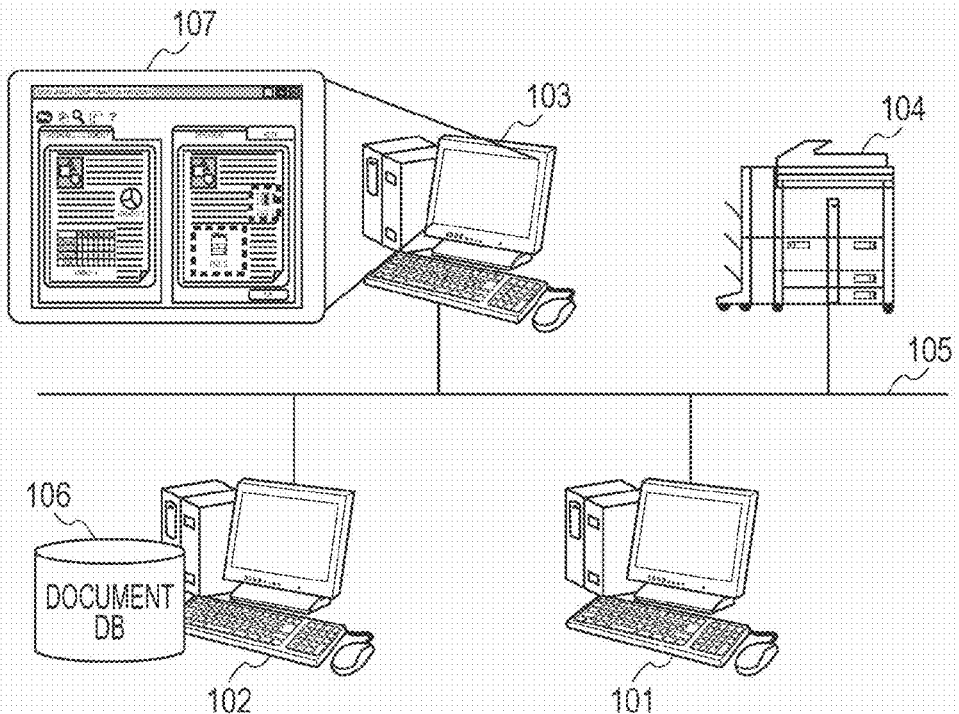
FIG. 1A is a diagram illustrating an embodiment of a configuration of a network system including an information processing apparatus according to an embodiment of the present invention.

FIG. 1A illustrates an example of a configuration of a network system including an information processing apparatus according to a first embodiment of the invention. In this example, the system includes an authentication server 101, a document management apparatus 102, a client PC 103, and a printer 104, and also includes a network 105 by which the units described above are connected to each other. In the system, the network may be connected via a router to client PCs on another network. The document management apparatus 102 may be realized using an information processing apparatus including a database 106 configured to store and mange objects which are parts extracted from document information. The database 106 may be implemented in a high-capacity storage apparatus such as a hard disk.

In FIG. 1A, a user inputs an ID and a password by operating a keyboard or the like of the client PC 103. In response, the authentication server 101 authenticates the user. If the user successfully passes the authentication performed by the authentication server 101, the user is allowed to use a resource such as the document management apparatus 102 or the printer 104.

More specifically, for example, the user of the client PC 103 is allowed to log in to the document management apparatus 102 to store document information in the database 106 or distribute document information stored in the database 106 to other users.

In the following description, by way of example, an explanation is given for a case where a user displays an operation screen 107 on a display device of the client PC 103 and transmits document information stored in the database 106 in the document management apparatus 102 to distribute the document information to other users. For example, depending on a user property of a user to which document information is to be sent, the document information is partially deleted and the layout of the document information is adjusted by the document management apparatus 102. The resultant document information with the adjusted layout is displayed on the operation screen 107 displayed on the display device of the client PC 103. The authentication server 101 has the capability of storing user properties in a storage device such as a hard disk and transmitting a user property in response to a request issued by the document management apparatus 102.

Figure 1B:
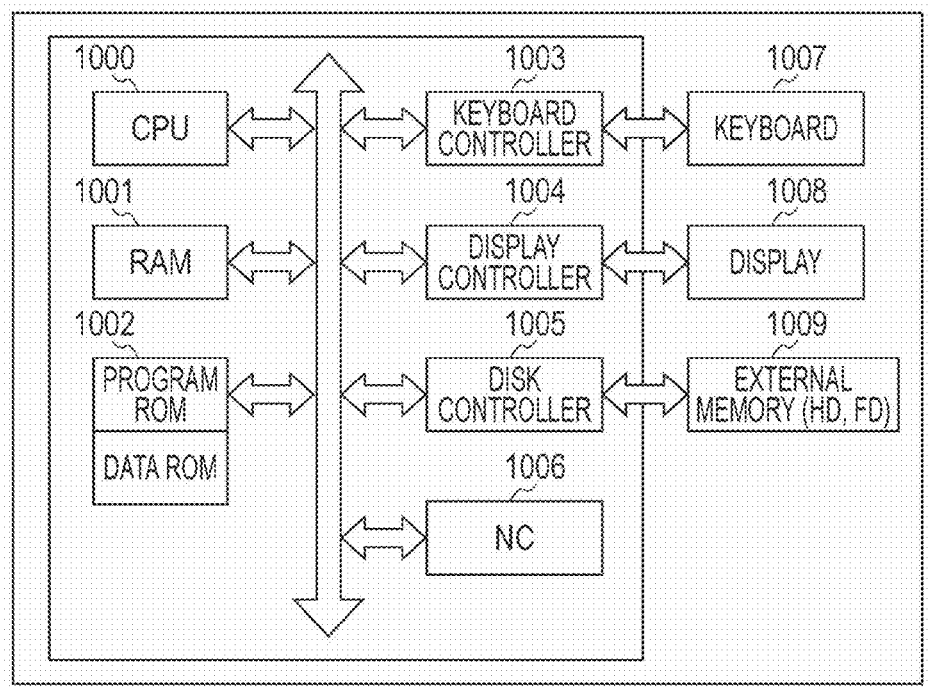
FIG. 1B is a block diagram illustrating a hardware configuration of an information processing apparatus according to an embodiment of the present invention.

FIG. 1B is a block diagram illustrating a hardware configuration of an information processing apparatus according to the present embodiment of the invention. Note that the client PC 103, the document management apparatus 102, and the authentication server 101 may be realized using an information processing apparatus having a similar hardware configuration to that described below with reference to FIG. 1B.

In FIG. 1B, a CPU 1000 is configured to execute programs such as an OS, an application program, etc., which may be stored in a ROM 1002 serving as a program ROM or which may be loaded in a RAM 1001 from an external memory 1009 such as a hard disk. The ROM 1002 includes a program ROM and a data ROM.

Note that OS is an abbreviation for "operating system" which runs on a computer. Hereinafter, the abbreviated-expression "OS" is used to describe "operating system". Processes described below with reference to flow charts are performed by executing corresponding programs on the OS.

The RAM 1001 functions as a main memory or a work area used by the CPU 1000. A keyboard controller 1003 controls key-inputting via a keyboard 1007 or a pointing device (not shown). A display controller 1004 controls a displaying operation of a display 1008. A disk controller 1005 controls accessing of data to an external memory 1009 such as a hard disk (HD) or a floppy disk (FD) for storing various kinds of data.

A network controller (NC) 1006 connected to the network 105 shown in FIG. 1 controls communication with other devices connected to the network 105.

A layout process according to the present embodiment is described below with reference to an editing screen shown in FIG. 2.

Total Processing Flow

FIG. 2 is a diagram illustrating a manner in which a document editing process is performed by an information processing apparatus according to the present embodiment of the invention. More specifically, in this example, a particular object included in an original document is modified depending on a user property of a user to which the document is to be sent. An example of objects which may be included in the original document 201 is a table or a graph indicating a management index. Based on information stored in the database 106 as to the user property of the user to which the document information is to be sent, an automatic determination is performed by the document management apparatus 102 as to whether such an object included in document information is allowed to be displayed. In accordance with the determination, the document information to be sent to the user is modified. The original document 201 includes objects 202 to 207. In the following explanation, by way of example, the properties of these objects are assumed such that the objects 202 to 205 is text, the object 206 is graphics, and the object 207 is a table.

That is, in the present embodiment, the property of each object includes feature information of the object and information indicating the type, the size, and the location of the object, and also includes information indicating a result of recognition of information present in the neighborhood of the object.

In a case where a user of the client PC 103 distributes a document stored in the database 106 managed by the document management apparatus 102 to other users, four processes are performed as shown in a flow chart of FIG. 3.

The flow chart in FIG. 3 illustrates an example of a data processing procedure performed by the information processing apparatus according to the present embodiment of the invention. In FIG. 3, S302 to S305 denote step numbers. These steps are performed by the CPU 1000 of the document management apparatus 102 by executing a management processing module loaded in a RAM from a ROM, a hard disk or the like.

First, in step S302, the CPU 1000 of the document management apparatus 102 performs a process #1 to delete objects that are not to be presented to the other users from the document information registered in the database 106. A blank area created in the document information as a result of the deletion of the object is hereinafter referred to as a vacant block. In the present embodiment of the invention, it is assumed by way of example that the document management apparatus is configured to display document information in units of pages. The document management apparatus may be configured to display pages in different manners. For example, pages may be displayed in a two-page spread form.

Next, in step S303, the CPU 1000 of the document management apparatus 102 performs a process #2 to determine whether it is possible to put another object in the vacant block created as a result of the process #1 in step S302.

If the determination made in step S302 by the CPU 1000 of the document management apparatus 102 is that it is impossible to put another object in the vacant block, then in step S304 a process #3 is performed to adjust a layout of the vacant block.

Finally, in step S305, the CPU 1000 of the document management apparatus 102 performs a process #4 to preview, for confirmation, the document subjected to the layout adjustment. The procedure is then ended. The processes #1 to #4 will be described in further detail later.

Document Status

An explanation is given below as to a manner in which document information is stored in the database 106 of the document management apparatus 102.

In the database 106 of the document management apparatus 102, document information is divided into objects such as text, figures, tables, images, etc., depending on the properties of the objects.

Text is further divided into objects in properly selected units such as chapters, paragraphs, sentences, meanings, etc. Note that a tag is attached to the property of each of all objects.

For example, for an object such as a figure or an image, a keyword or the like corresponding to feature information of the object may be assigned as a property. For text, a summary thereof may be assigned as a property. By defining the properties of the respective objects in the above-described manner, it becomes easier to perform meaningful searching. The property may include information indicating a security level or a confidentiality level. In the present embodiment, the document management apparatus 102 manages, as a property, a result of recognition of objects that are present in the neighborhood of a particular object. This makes it possible to lay out objects in a blank area.

As described above, the document information is divided into objects, and properties are assigned to the respective objects thereby making it possible to control accessing, re-using, etc., of the objects separately for each object.

Process #1

FIG. 4 is a flow chart illustrating an example of a data processing procedure performed by the information processing apparatus according to the present embodiment of the invention. More specifically, FIG. 4 illustrates the details of the process #1 shown in FIG. 3. In FIG. 4, S402 to S409 denote step numbers. These steps are performed by the CPU 1000 of the document management apparatus 102 by executing a management processing module loaded in a RAM from a ROM, a hard disk or the like.

In step S402 of the process #1, the CPU 1000 of the document management apparatus 102 acquires a user property of a user to which the document information is to be sent and also acquires properties of respective objects in the document information to be sent. Note that the user property is acquired by the document management apparatus 102 from the authentication server 101 in accordance with the user ID of the user to which the document information is to be sent.

In this step S402, the CPU 1000 of the document management apparatus 102 acquires the property of each object in the document information to be sent from the database 106.

Next, in step S403, the CPU 1000 of the document management apparatus 102 determines whether each object is allowed to be displayed by checking the property of each object in the document information based on the user property, acquired from the authentication server 101, of the user to which the document information is to be sent. In the present embodiment, by way of example, it is assumed that the checking of the property of each object in the document information to determine whether each object is allowed to be displayed is performed on a page-by-page basis. Alternatively, the checking may be performed in units of two spread pages.

Next, in step S404, the CPU 1000 of the document management apparatus 102 determines whether the result of the check in step S403 indicates that the object is allowed to be displayed. If the CPU 1000 of the document management apparatus 102 determines that the object is allowed to be displayed, then in step S405 the CPU 1000 of the document management apparatus 102 displays this object without making any modification.

On the other hand, in a case where the determination in step S404 by the CPU 1000 of the document management apparatus 102, the process proceeds to step S406.

In step S406, the CPU 1000 of the document management apparatus 102 deletes the object of interest. Furthermore, in step S407, the CPU 1000 of the document management apparatus 102 defines an area where the deleted object was located as a vacant block. The process then proceeds to step S408.

In step S408, the CPU 1000 of the document management apparatus 102 determines whether the determination process described above has been performed for all objects. In step S409, the CPU 1000 of the document management apparatus 102 determines whether the object of interest is a last object. If the determination made by the CPU 1000 of the document management apparatus 102 is that the object of interest is the last object, then the present process is ended. On the other hand, in a case where the determination process described above is not completed for all object, the flow returns to step S403.

Example of a Process of Controlling an Object Not to Be Displayed

Referring to FIG. 2, a detailed explanation is given below as to an example of a data processing of making a determination based on the user property as to whether objects included in document information should be displayed.

In the example shown in FIG. 2, the original document 201 produced by the user by executing an application program on the client PC 103 includes objects 202 to 207. In the example shown in FIG. 2, the properties of objects 202 to 205 are defined as text, the property of the object 206 is defined as graphics, and the property of the object 207 is defined as table.

When the original document 201 is sent to another user, the document management apparatus 102 first acquires the user property of the user to which the original document 201 is to be sent.

In a first comparison process, comparison is performed in terms of a security level or a confidentiality level defined as one of property items. For example, if the user to which the document is to be sent is a general employee, it is determined that objects with a high security level or a high confidentiality level are not allowed to be displayed. The security level or the confidentiality level may be assigned such that general employees are assigned "1", managers are assigned "2", executives are assigned "3", and senior executives are assigned "4", while values properly selected from "1" to "4"

may be assigned to the property values of the respective objects. Such assignment of values makes it easy to perform the comparison.

For example, in a case where an object 206 is a graph indicating market shares and is assigned "2" as the confidentiality level, if the user to which a document including this object 206 is to be sent is a general employee, then this object 206 is determined as an object that should not be displayed because the general employees is "1" in confidentiality level.

In a second comparison process, comparison is performed in terms of a department to which a user belongs, which is one of items of user property.

Values are assigned to respective departments, for example, such that "A" is assigned to a sales department, "B" to an engineering department, and "C" to an accounting department. On the other hand, each object is assigned a value indicating a department for which the object is allowed to be disclosed. For example, if an object is allowed to be disclosed only to employees in the engineering department, the access-allowed department is defined as "B". If an object is allowed to be disclosed to all departments, the access-allowed department is defined as "A, B, C".

For example, when an object 207 is a function comparison table of a product and this object 207 is allowed to be disclosed to the department "B", if a document including this object 207 is to be sent to a user belonging to the sales department, then the comparison will results in a conclusion that the object 207 is not allowed to be disclosed to this user.

As described above, the CPU 1000 of the document management apparatus 102 executes the management processing module to determine whether each object is allowed to be displayed, based on the pre-registered properties. Thereafter, in step S406 in FIG. 4, the CPU 1000 of the document management apparatus 102 deletes the "Graph 1" corresponding to the object 206 and the "Table 1" corresponding to the object 207 from the original document 201.

The document information in the state in which the object 206 and the object 207 are deleted is shown on the right-hand side of FIG. 2. In step S407, no objects are now present in areas where the objects 206 and 207 were present. These areas where no objects are present are hereinafter referred to as vacant blocks 216 and 217.

In the document 211 to be sent to the particular user, objects 212 to 215 shown on the right-hand side of FIG. 2 are obtained as a result of maintaining objects 202 to 205 (shown on the left-hand side of FIG. 2) in the original document 201.

Process #2

The process #2 shown in FIG. 3 performed by the document management apparatus 102 is described in further detail below with reference to a flow chart shown in FIG. 5.

Figure 5:
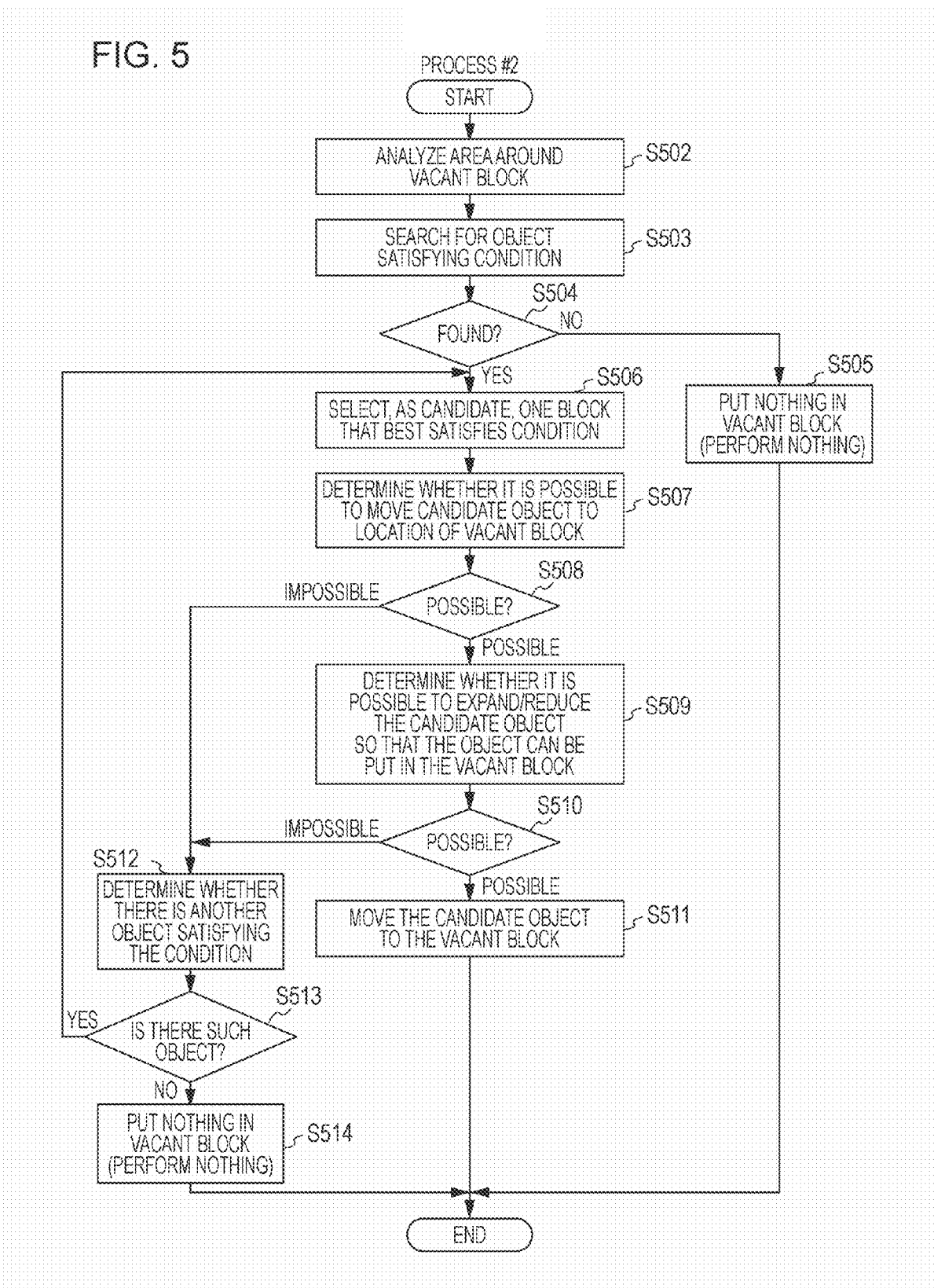
FIG. 5 is a flow chart illustrating an example of a data processing procedure performed by an information processing apparatus according to an embodiment of the present invention.

FIG. 5 is a flow chart illustrating an example of a data processing procedure performed by the information processing apparatus according to the present embodiment of the invention. More specifically, FIG. 5 illustrates the details of the process #2 shown in FIG. 3. In FIG. 5, S502 to S514 denote step numbers. These steps are performed by the CPU 1000 of the document management apparatus 102 by executing a management processing module loaded in a RAM from a ROM, a hard disk or the like.

In step S502 of the process #2, the CPU 1000 of the document management apparatus 102 analyzes the property of each of objects located in the neighborhood of the vacant blocks 216 and 217 shown in FIG. 2 to determine properties of objects to be put in the vacant blocks.

Next, in step S503, the CPU 1000 of the document management apparatus 102 performs document information analysis within the current document information to search for objects satisfying predetermined property conditions. In step S504, based on the result of the search, the CPU 1000 of the document management apparatus 102 determines whether there is an object satisfying the predetermined property conditions.

In a case where the determination made by the CPU 1000 of the document management apparatus 102 is that there is no object satisfying the predetermined property conditions, the process proceeds to step S505. In step S505, the vacant blocks are maintained in the vacant state, and the present process is ended.

On the other hand, the determination made in step S504 by the CPU 1000 of the document management apparatus 102 is that there is an object satisfying the predetermined property conditions, the process proceeds to step S506.

In step S506, if two or more objects satisfying the predetermined property conditions are found in the search, then the CPU 1000 of the document management apparatus 102 selects an object that best satisfies the property conditions as a candidate for an object to be put in the vacant block.

Next, in step S507, the CPU 1000 of the document management apparatus 102 checks the property of the object selected as the candidate to determine whether it is possible to move this object to a location of the vacant block 216 or 217. In step S508, the CPU 1000 of the document management apparatus 102 determines whether the result of the check is positive or negative. If the determination by the CPU 1000 of the document management apparatus 102 is that the movement of the object is possible, then in step S509 the CPU 1000 of the document management apparatus 102 further checks the property of the object selected as the candidate to determine whether it is possible to enlarge or reduce the object so as to fit the size of the vacant block 216 or 217.

In step S510, the CPU 1000 of the document management apparatus 102 determines whether the result of the check is positive or negative. If the determination by the CPU 1000 of the document management apparatus 102 is that the enlargement/reduction is possible, then in step S511, the CPU 1000 of the document management apparatus 102 moves the object selected as the candidate to the vacant block 216 or 217. The process is then ended.

In a case where the determination made by the CPU 1000 of the document management apparatus 102 in step S508 or S510 is negative, the process proceeds to step S512.

In step S512, the CPU 1000 of the document management apparatus 102 advances the processing flow to step S512 without moving the candidate object.

In step S512, the CPU 1000 of the document management apparatus 102 determines whether there are one or more further objects that satisfy the conditions. If the determination result in step S513 by the CPU 1000 of the document management apparatus 102 is positive, then the processing flow returns to step S506. In step S506, an object that next best satisfies the property conditions is selected as a candidate for an object to be put in the vacant block, and the process described above is repeated.

On the other hand, if the determination result in step S513 by the CPU 1000 of the document management apparatus 102 is negative, then the process proceeds to step S514. In step S514, the CPU 1000 of the document management apparatus 102 maintains the vacant blocks in the vacant state without performing anything thereon. The present process is then ended.

Analysis Process in Process #2

The analysis process and search process in steps S502 to S504 are described in further detail below with reference to the original document 201 shown in FIG. 2.

In the following explanation, by way of example, the process for the vacant block 216 shown in FIG. 2 is described. In the example shown in FIG. 2, there are objects adjacent to the vacant block 216. They are a title text object 212 and text objects 213 and 214. There is also an object 215 which is in the neighborhood of the vacant block 216, although it is not directly adjacent to the vacant block 216.

A process of analyzing the property of these adjacent or neighboring objects is described below.

The CPU 1000 of the document management apparatus 102 calculates the sum of properties of the objects located in the neighborhood in terms of a property item such as keyword for figure objects or image objects or summary for text objects.

For example, in a case where the property of interest is a keyword, the CPU 1000 of the document management apparatus 102 counts the number of occurrences of each keyword or classifies the objects by the keywords to determine the tendency of the keywords of the objects 212 to 215 located in the neighborhood of the vacant block 216.

In a case where the property of interest is a summary, the CPU 1000 of the document management apparatus 102 produces a meaning vector of the summary of each of the objects 212 to 215 located in the neighborhood and calculates the total value of the summaries of the objects 212 to 215. Thus, the CPU 1000 of the document management apparatus 102 analyzes the properties of the neighboring objects 212 to 215 in the above-described manner.

When an object put in the vacant block 216 has a keyword property or a summary property similar to those of the neighboring objects 212 to 215, a resultant document is consistent and natural in meaning.

In view of the above, in the present embodiment, the value obtained as a result of the property analysis performed in the above-described manner is defined as a property value of an object that should be put in the vacant block 216.

The property of the object 215 which is not directly adjacent but located in the neighborhood may be weighted by a smaller factor than the properties of adjacent objects, as described below.

That is, the sum of the property values of the neighboring objects 212 to 215 may be calculated for weighted values such that the object 215 is less weighted than the objects 213 and 214. As for the vacant block 217 shown in FIG. 2, there are no objects, and thus the property analysis is not performed.

The property analysis may be performed in terms of the structure of meaning of neighboring objects. By way of example, an explanation is given below for a case where when an original document having a structure of objects A→B→C is given, an object B is deleted from this document and thus the document has a structure of the object A→a vacant block→the object C.

In this case, based on the structure of the object A→the vacant block→the object C, desirable conditions of an object to be put in the vacant block are analyzed.

In the following explanation, by way of example, it is further assumed that the objects included in the original document include contents such as those described below.

The object A is a list of user's demands collected from users via questionnaires or the like.

The object B is a list of functions of products accepted in markets found as a result of analysis of shares in terms of various kinds of products provided by various companies.

The object C is a description of a concept of a new product to be put into markets.

When the document is distributed, a modification is made such that the object B representing the share analysis is deleted from the document except for documents distributed to persons in the sales department. In this case, based on the meaning property of the documents A and C, an object D is selected because it has a property suitable for being put in the vacant block.

For example, the selected object D represents analysis of functions of a product of a company compared with functions of products of other companies and represents strong/weak points of the product.

The analysis is performed for A→D→C to check whether the document has a structure that is consistent in terms of meaning. In the present embodiment, the condition to be satisfied by an object to be put in the vacant block is set to require that the object should have a relation, in meanings or keywords, to the user's demands and the concept of the new product to be put into markets, as with the object D. Note that the analysis process described above is a merely illustrative example, and the analysis process may be performed in different manners taking into account other user property items.

In the related arts, a large number of ideas of analyzing documents using an inference engine have been proposed. The inference engine may be used in the above-described analysis on vacant blocks to determine the condition of an object suitable for being put in a vacant block.

Search Process in Process #2

After the analysis process performed in step S502 in the above-described manner is completed, the CPU 1000 of the document management apparatus 102 compares the property value of each object in the document with the property value defined in the above-described manner. Note that the comparison is performed for all objects within the document. In a case where the property of interest is the keyword, objects having the same or similar keyword are searched for within the current document.

In the searching process, the CPU 1000 of the document management apparatus 102 determines the degree of similarity of the keyword based on a keyword dictionary or a database.

In this process, the CPU 1000 of the document management apparatus 102 may represent the degree of similarity by numeric values (scores). This makes it possible to easily detect an object with highest similarity in step S506 in the following process.

On the other hand, in a case where the property of interest is in terms of meaning, the CPU 1000 of the document management apparatus 102 searches for an object with a meaning vector having a similar direction, based on the meaning vectors analyzed in the property analysis.

As described above, the CPU 1000 of the document management apparatus 102 searches the document to find an object to be put in the vacant block 216. If a plurality of objects are found in the search, the CPU 1000 of the document management apparatus 102 sorts them according to the degree of similarity.

The analysis process and the search process in steps S502 to S504 have been described above with reference to FIG. 5.

Process in Process #2 to Evaluate Candidate

In step S507, the CPU 1000 of the document management apparatus 102 determines whether the object selected in step S506 as the candidate can be moved to the vacant block subjected to the process #2.

First, the CPU 1000 of the document management apparatus 102 checks whether the property of the object selected as the candidate includes an item in which restriction is defined on the description location of the object. Depending on the registered object, the object is allowed to be put at restricted locations.

For example, some objects have a logical sentence structure that does not allow the objects to be put at the beginning or the end of a document. Some objects are allowed to be put only in an introductory part but are not allowed to be put in other parts such as an intermediate part or a conclusive part. Some objects are allowed to be put only in a conclusive part but are not allowed in other parts such as a background description part or a main part. Some objects have a correlation to other objects, and such a correlation restricts the location thereof to a particular location in a document, such as a location before or after a particular object with which the object of interest has a correlation.

If the CPU 1000 of the document management apparatus 102 determines that the property of the object selected as the candidate indicate that the object is allowed to be put only at restricted locations, then the CPU 1000 of the document management apparatus 102 checks whether the vacant block does not conflict with the restriction.

In another example, in the process #2, the CPU 1000 of the document management apparatus 102 checks whether the property of the object selected as the candidate includes definition of restriction on the range within which the enlargement/reduction is allowed.

In general, when an object such as an image, a figure, etc. is moved, the object may be maintained at its original size or the size thereof may be enlarged or reduced depending on the situation. For example, when the object selected as the candidate has a large size and the vacant block is small in size, the CPU 1000 of the document management apparatus 102 reduces the object selected as the candidate and moves it into the vacant block.

However, if the size of the object is reduced too much, it becomes impossible to read or understand small characters in the figure or table. Thus, all objects selected as candidates are not necessarily allowed to be enlarged or reduced. Therefore, the reduction of the object is allowed within a range greater than a lower limit.

On the other hand, when the object selected as the candidate is small in size and the vacant block is large in size, if the image is enlarged too much, jaggies become too large. Thus, for picture images that are needed to have high image quality, the enlargement is allowed within a range in which specified high image quality can be achieved.

As described above, the property of the object selected as the candidate may include a definition of an allowable enlargement/reduction range.

Thus, when the property of the object selected as the candidate includes a definition of an allowable enlargement/reduction range, the CPU 1000 of the document management apparatus 102 checks whether the vacant block does not conflict with the restriction on the enlargement/reduction.

Thus, in the process #2, the CPU 1000 of the document management apparatus 102 analyzes the keyword or summary property of each object located in the neighborhood of the vacant block. The CPU 1000 of the document management apparatus 102 then searches the document of interest for objects that are similar in meaning. The CPU 1000 of the document management apparatus 102 then checks the objects found in the search one by one in the order from highest to lowest of similarity to determine whether the object can be moved to the vacant block. If the CPU 1000 of the document management apparatus 102 founds an object that can be moved, then the CPU 1000 of the document management apparatus 102 moves the found object to the vacant block. If no objects are found, nothing is put in the vacant block. The details of the process #2 performed by the CPU 1000 of the document management apparatus 102 have been described above.

Process #3

When the CPU 1000 of the document management apparatus 102 finds no object having high similarity in meaning to be moved to the vacant block, the CPU 1000 of the document management apparatus 102 performs a post-process in the process #3.

Figure 6:
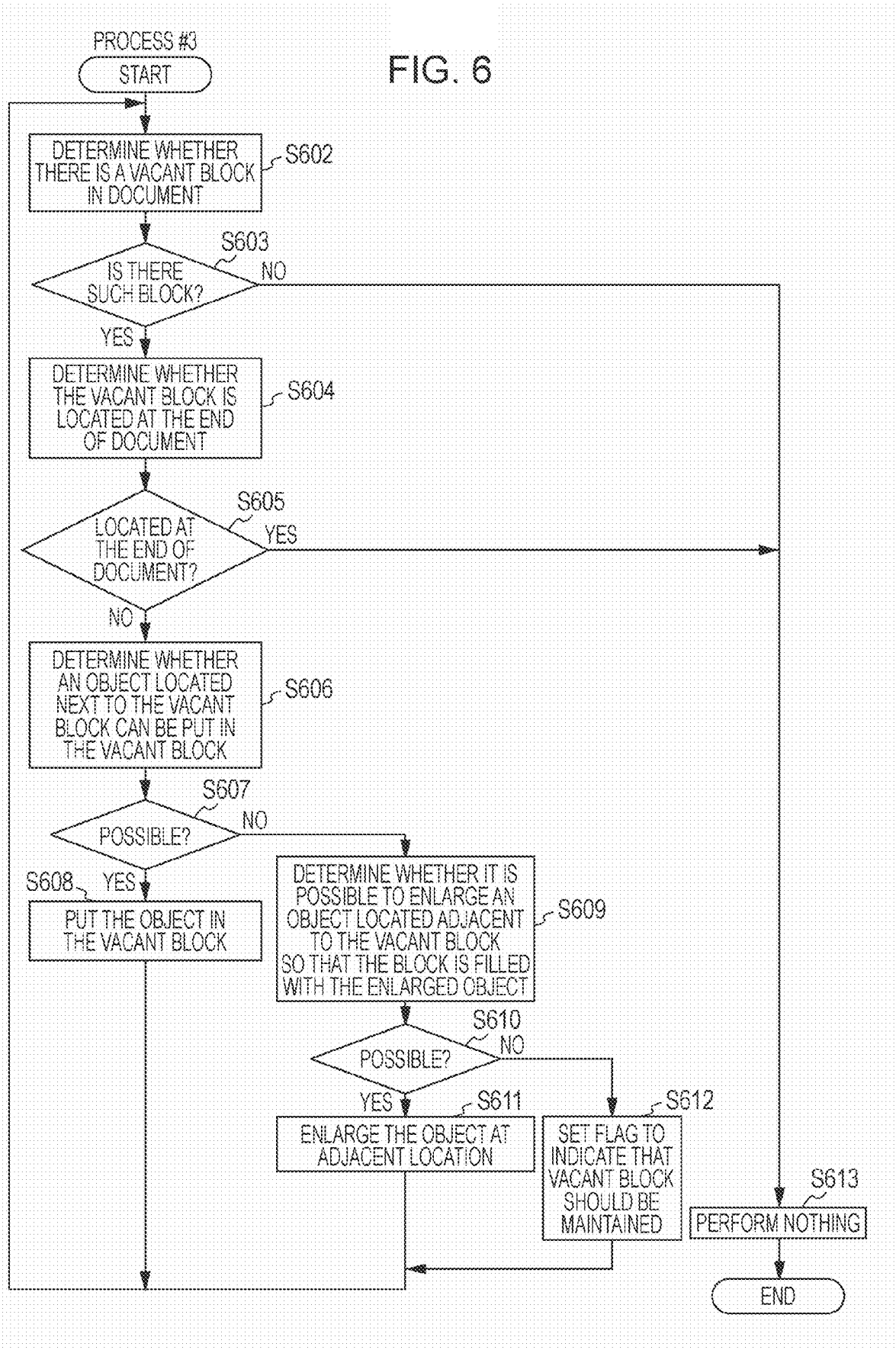
FIG. 6 is a flow chart illustrating an example of a data processing procedure performed by an information processing apparatus according to an embodiment of the present invention.

FIG. 6 is a flow chart illustrating an example of a data processing procedure performed by the information processing apparatus according to the present embodiment of the invention. More specifically, FIG. 6 illustrates the details of the process #3 shown in FIG. 3. In FIG. 6, S602 to S613 denote step numbers. These steps are performed by the CPU 1000 of the document management apparatus 102 by executing a management processing module loaded in a RAM from a ROM, a hard disk or the like.

In step S602 of the process #3, the CPU 1000 of the document management apparatus 102 performs a process to determine whether there is a vacant block in the document. In step S603, the CPU 1000 of the document management apparatus 102 determines whether the determination as to the presence of a vacant block is positive or negative. If the determination by the CPU 1000 of the document management apparatus 102 is that there is no vacant block, as in a case where similar objects have been moved to all vacant blocks in the process #2, then the processing flow proceeds to step S613. Nothing is performed in step S613, and the present process is ended.

In a case where the determination made in step S603 by the CPU 1000 of the document management apparatus 102 is that there is a vacant block, the processing flow proceeds to step S604. In step S604, a process is performed to determine whether the detected vacant block is located at the end of the document. If it is determined in step S605 by the CPU 1000 of the document management apparatus 102 that the vacant block is located at the end of the document, the processing flow proceeds to step S613. Nothing is performed in step S613 and the present process is ended because there is no necessity for such a vacant block located at the end of the document to be filled. For example, when there are two vacant blocks 216 and 217, an object is moved to the vacant block 216 whereby the vacant block 216 is filled. However, when there is only one vacant block 217, the present process is ended without performing anything.

On the other hand, if the determination in step S605 by the CPU 1000 of the document management apparatus 102 is that the location of the vacant block is not at the end of the document, the processing flow proceeds to step S606. For example, when there are two vacant blocks 216 and 217, an object is moved to the vacant block 217 whereby the vacant block 217 is filled. However, when there is only one vacant block 216, the present process is ended without performing anything.

In step S606, the CPU 1000 of the document management apparatus 102 starts the process for the vacant block. More specifically, the CPU 1000 of the document management apparatus 102 performs a determination in terms of the layout of document as to whether an object at a location next to the vacant block can be moved up into the vacant block. This determination process is similar to that performed in steps S507 and S513 in the process #2.

In step S607, the CPU 1000 of the document management apparatus 102 determines whether the result of the determination in previous step is positive. If the determination by the CPU 1000 of the document management apparatus 102 is positive, then the processing flow proceeds to step S608.

In step S608, the CPU 1000 of the document management apparatus 102 moves up the object at the next location into the vacant block. The processing flow then returns to step S602.

In a case where the determination in step S607 by the CPU 1000 of the document management apparatus 102 is that the object at the next location cannot be moved up, the processing flow proceeds to step S609.

In step S609, the CPU 1000 of the document management apparatus 102 performs a process to determine whether it is possible to fill the vacant block by enlarging an object adjacent to the vacant block. This determination process is basically similar to step S513 in the process #2.

In step S610, the CPU 1000 of the document management apparatus 102 determines the result of the determination as to whether it is possible to fill the vacant block by enlarging an object adjacent to the vacant block. If the result of the determination by the CPU 1000 of the document management apparatus 102 is positive, then the processing flow proceeds to step S611. In step S611, the object adjacent to the vacant block is enlarged such that the vacant block is filled with the enlarged object. The processing flow then returns to step S602.

On the other hand, if the result of the determination in step S610 by the CPU 1000 of the document management apparatus 102 is that it is impossible to fill the vacant block by enlarging an object adjacent to the vacant block, then the processing flow proceeds to step S612. In step S612, the CPU 1000 of the document management apparatus 102 sets up a flag to indicate that nothing should be performed on the vacant block but the vacant block should be maintained in the vacant state. The processing flow then returns to step S602.

In the present embodiment, after step S608, S611, or S612 is completed, the processing flow returns to step S602 to repeat the above-described process as long as there is a vacant block in the document.

If it is determined in step S603 by the CPU 1000 of the document management apparatus 102 that the process has been performed for all vacant blocks, the processing flow proceeds to step S613 to end the present process.

Process #4

FIG. 7 is a flow chart illustrating an example of a data processing procedure performed by the information processing apparatus according to the present embodiment of the invention. More specifically, FIG. 7 illustrates the details of the process #4 shown in FIG. 3. In FIG. 7, S702 to S705 denote step numbers. These steps are performed by the CPU 1000 of the document management apparatus 102 by executing a management processing module loaded in a RAM from a ROM, a hard disk or the like.

If the process #4 is started, then in step S702, the document management apparatus 102 produces a document obtained as a result of the processes #1 to #3 and displays the resultant document on a display of the client PC 103 of the user. More specifically, in the present embodiment, the resultant document is displayed on the display connected to the client PC 103 via the browser running on the client PC 103 from which the document is provided.

A preview document obtained as a result of the processes #1 to #3 is displayed on the display of the client PC 103 in a form that allows a user to edit the document. If the user determines that the preview document displayed on the display of the client PC 103 is approvable, the user inputs an approval command by operating an input device thereby informing the document management apparatus 102 of the approval.

If the CPU 1000 of the document management apparatus 102 confirms that the approval command has been input to the client PC 103 in step S703, then in step S705 the CPU 1000 of the document management apparatus 102 sets the currently displayed layout to be final and conclusive. The present process is then ended.

Note that during a period in which the user has not yet input the approval command, the user is allowed to edit the layout on the preview document as will be described below.

Displaying Preview on Client PC

When a user operates the document management apparatus 102 via the client PC 103, the operation is performed using the operation screen 107 displayed on the display of the client PC 103.

For example, in a case where the document management apparatus 102 has a specific application installed therein for displaying the operation screen 107 on the client PC 103, the client PC 103 is allowed to display the operation screen 107 by using dedicated client software or a general Web client application.

In a case where a Web server is used as the document management apparatus 102, the client PC 103 functions as a Web client.

The accessing to the document management apparatus 102 may also be possible using a file access function provided by an OS running on the client PC 103 (an example of a file access function is an explorer of Windows® and another example is a finder provided by Mac®).

The document management apparatus 102 may be operated in many different ways as described above. In any way, a user is allowed to treat a document of interest via the operation screen 107 of the client PC 103.

Previewing of a document in step S702 in FIG. 7 is described in further detail below with reference to FIG. 8.

FIG. 8 illustrates an example of a user interface displayed on the display of the client PC 103 shown in FIG. 1. More specifically, a document confirmation window displayed in step S702 on the display of the client PC 103 is shown in FIG. 8. In the case where the dedicated client software installed on the client PC 103 is used, a preview function may be provided by the dedicated client software. In the case where general software is used, a preview function may be provided by plug-in software. By using such software, it is allowed to display a screen for viewing adjusted and unadjusted layouts of document information as shown in FIG. 8.

In the present embodiment, both an image of an original document and a preview image of an adjusted document are displayed in the document confirmation window using the dedicated client software as shown in FIG. 8, although there is no particular restriction on the method of providing the preview function.

Document Confirmation Window Displayed on Client PC

If the process in step S702 in FIG. 7 is performed, a preview image of a document is displayed in a user-editable form in the document confirmation window 801 displayed on the display of the display of the client PC 103, for example, as shown in FIG. 8.

The document confirmation window 801 includes an original document display frame 802 for displaying an original document 803 and a preview document display frame 804 for displaying a processed document 805 that has been subjected to the processes #1 to #4 shown in FIG. 3. In the present embodiment, these two frames may be displayed side by side so that a user is allowed to easily compare them.

For landscape or horizontally scrollable documents, two frames may be placed vertically side by side. The display mode may be switched by a user using a display mode change button 812.

In the example shown in FIG. 8, as a result of the execution of the processes #1 to #4 shown in FIG. 3 by the document management apparatus 102, the processed document 805 includes objects 808 and 810 changed from objects in the original document.

In the present embodiment, in order for a user to easily recognize changed parts, the changed objects are highlighted by being enclosed in a box of a dotted bold line 807 or 809. The manner of highlighting shown here is a merely illustrative example, and many other methods may be employed. For example, a background color may be changed, or an object may be marked with a noticeable symbol.

When the user wants to change the layout of the document displayed in the preview document display frame 804, the user is allowed to edit it on this screen.

For example, a hand tool button 813 may be used to freely move the location of an object by a drag-and-drop operation.

The hand tool button 813 may also be used in enlarging or reducing the size of an object.

When an object changed via the processes #2 and #3 shown in FIG. 3 is inappropriate, a tool button 814 may be used to display a movement history thereby allowing an original location of the object to be displayed.

If the user determines that the object should be at the original location, the user may use the tool button 814 to move the object back to the original location. After the object has been moved back to its original location according to an instruction issued by the user, a candidate for a proper object to be put in the vacant block may be searched for by again performing the process #2 in accordance with an instruction issued by the user.

If the user of the client PC 103 determines that the processed document 805 displayed in the preview document display frame 804 displayed on the display is approvable, the user presses an OK button 811.

In the document management apparatus 102, if the answer to step S704 is determined to be affirmative, the processed document being currently displayed is set to be final and conclusive.

In the example described above, the user of the client PC 103 edits the preview document in the preview document display frame 804.

Alternatively, in a case where an operation is explicitly switched between a preview mode and an edit mode, editing is allowed only when an edit tab 806 is selected.

In this case, the background color of the edit tab may be changed from a color displayed in the preview mode or the hand tool button 813 may be disabled in the preview mode thereby informing the user of the current operation mode.

Second Embodiment

In the first embodiment described above, in step S503 in FIG. 5, the document management apparatus 102 performs searching within the same document. Alternatively, other documents stored in the database 106 may be searched in addition to the current document, as described below.
Extending Search Range For example, when the documents managed by the document management apparatus 102 include one or more documents similar to the current document, such similar documents may also be subjected to the search. The document management apparatus may detect similar documents by detecting documents having titles with high correlation, documents in which similar keywords occur a large number of times, or documents having a similar summary property represented by a meaning vector with a similar direction.

Instead of documents, objects tagged with keywords or summaries managed by the database 106 may be subjected to the search.

In the case where it is determined in step S504 in FIG. 5 that no suitable objects are found, before step S505 is performed to maintain a vacant block in a vacant state, the document management apparatus 102 may prompt a user to input a command indicating whether searching should be performed over documents other than the current document. If the user inputs a command to instruct that searching should be performed in such a manner, the document management apparatus 102 performs searching in accordance with the input command.

By expanding the search range so as to include other documents in addition to the current document, it becomes possible to increase the probability that an object can be found which is suitable in terms of meaning relative to the meanings of objects in the neighborhood of the vacant block.

Some objects are used many times in different documents. For such an object, information on a reuse history, or a name, an ID, and/or a type of a document in which the object was used for the first time may be written as a property of the object. If an object deleted from an original document has such a property, the searching may be expanded to documents indicated by the property.

In the case where the determination result in step S504 in FIG. 5 is that no suitable object is found, before step S505 is performed to maintain a vacant block in a vacant state, the document management apparatus 102 may check the above-described property of the object deleted from the original document and may put documents with the same property into the search process.

By limiting the search process to particular documents including the same object as the deleted object, it becomes possible to increase the probability of finding an object similar in meaning to the deleted object. This allows an increase in efficiency of finding objects.

Third Embodiment

Alternative Method of Analysis

In the previous embodiments described above, the analysis in step S502 in the process #2 shown in FIG. 3 is performed by the document management apparatus 102 based on the properties.

Alternatively, the analysis and the search may be performed using document templates.

In this case, for example, in the analysis step S502, a template most similar to the current document may be selected from a plurality of document templates managed by the document management apparatus or other apparatuses.

In this analysis process, the template is determined according to the pattern analysis on the document structure such as an introduction, adequate development and a conclusion or according to a classification rule in terms of document purposes such as function specifications, a new product proposal, etc.

The document management apparatus 102 collects a large number of documents to which the same template can be applied with reference to the template determined in the analysis process. The document management apparatus 102 analyzes the collected documents to detect a tendency of document contents for each template.

Thus, the document management apparatus 102 estimates the tendency of the documents to be processed in the above-described manner, and the document management apparatus 102 further estimates what objects tend to be put in vacant blocks of the documents subjected to the process.

The document management apparatus 102 performs the analysis in step S502 in the above described manner to determine a condition to be satisfied by an object to be put in a vacant block.

By performing the analysis using the template in the above-described manner, it becomes possible to evaluate the suitability of objects by making a comparison with a set value obtained via the analysis for a large number of accumulated data. This makes it possible to determine a search condition more suitable for analysis of an object to be put in a vacant block.

The techniques disclosed in the embodiments described above make it possible to delete an object, which should be disclosed, from an original document, depending on a user property of a user to which the document is to be distributed. After the object is deleted, an optimum object is selected from adjacent objects included in the document and moved into the vacant block created as a result of the deleting of the object thereby producing a document having a consistent meaning.

Fourth Embodiment

In the previous embodiments described above, when a vacant block is created as a result of deleting an object, another object is searched for based on a meaning property and a detected object is put in the vacant block.

In a case where a plurality of vacant blocks are created at adjacent locations as a result of deleting, the plurality of vacant blocks may be combined into a single great vacant block.

In this case, the properties of objects at locations adjacent to the created vacant block may be analyzed and grouping may be performed in terms of meanings. After a plurality of groups are created according to the meanings, the created great vacant block may be divided depending on the number of groups. Objects to be put in the respective parts of the vacant block may be searched for, and detected objects may be put in the respective parts of the vacant block such that a consistent meaning as a whole can be obtained.

In this case, searching is not limited to the current document but a database including data of a large number of objects may be subjected to the search.

A template may be used to find candidates for objects to be put in a plurality of parts of a vacant block.

Fifth Embodiment

In the previous embodiments described above, a user of the client PC 103 determines whether a modified document is approvable. If the user approves the document, the document information is set to be final and conclusive. Alternatively, a vacant block may be automatically filled using a DEL (Dynamic Layout Engine).

Sixth Embodiment

Next, referring to a memory map shown in FIG. 9, a data processing program readable by a document management apparatus according to an embodiment of the invention is described below.

FIG. 9 is a diagram illustrating a memory map of a storage medium that stores various data processing programs readable by a document management apparatus according to an embodiment of the present invention.

Information for managing the programs stored in the storage medium, such as information indicating the version, a producer, or the like, and/or other additional information, such as icons indicating respective programs, depending on an operating system (OS) that reads the programs may also be stored in the storage medium.

Data associated with respective programs are also managed by directories. A program for installing a program on a computer may also be stored on the storage medium. When a program to be installed is stored in a compressed form, a program for decompressing the program may also be stored on the storage medium.

The functions shown in FIGS. 3 to 7 according to embodiments of the invention may be realized by installing a program from the outside and executing it on a host computer. In this case, information including the program according to the present invention may be supplied to the host computer from a storage medium such as a CD-ROM, a flash memory, or an FD, or from an external storage medium via a network.

The present invention may also be practiced by supplying a medium such as a storage medium having a software program code stored therein to an apparatus, loading the software program code from the medium onto a computer (or a CPU or an MPU) of a system or an apparatus, and executing the software program on the computer.

In this case, the program code read from the storage medium implements the novel functions disclosed in the embodiments described above, and the storage medium on which the program code is stored falls within the scope of the present invention.

In this case, there is no particular restriction on the form of the program as long as it functions as a program. That is, the program may be realized in various forms such as an object code, a program executed by an interpreter, script data supplied to an operating system, etc.

Storage media which can be employed in the present invention to supply the program include a floppy disk, a hard disk, an optical disk, a magneto-optical disk, an MO disk, a CD-ROM disk, a CD-R disk, a CD-RW disk, a magnetic tape, a non-volatile memory card, a ROM, and a DVD disk.

In this case, the program code read from the storage medium implements the functions disclosed in the embodiments described above, and the storage medium on which the program code is stored fall within the scope of the present invention.

The program may also be supplied such that a client computer is connected to an Internet Web site via a browser, and an original computer program or a file including a compressed computer program and an automatic installer may be downloaded into a storage medium such as a hard disk of the client computer thereby supplying the program. The program code of the program according to an embodiment of the present invention may be divided into a plurality of files, and respective files may be downloaded from different Web sites. Thus, a WWW server, an ftp server and similar servers that provide a program or a file that allows the functions according to an embodiment of the present invention to be implemented on a computer also fall within the scope of the present invention.

The program according to the present invention may be stored in an encrypted form on a storage medium such as a CD-ROM and may be distributed to users. Particular authorized users are allowed to download key information used to decrypt the encrypted program from a Web site via the Internet. The decrypted program may be installed on a computer using the downloaded key information thereby achieving the one or more functions according to any embodiment of the present invention.

The functions disclosed in the embodiments may be implemented not only by executing the program code on a computer, but part or all of the process may be performed by an operating system or the like running on the computer in accordance with the program code. Such implementation of the functions also falls within the scope of the present invention.

Furthermore, the scope of the present invention also includes an apparatus/system in which a program code is loaded from a storage medium into a memory provided on a function extension board inserted in a computer or provided in a function extension unit connected to the computer, and then a part of or the whole of a process is performed by a CPU or the like in the function extension board or the function extension unit in accordance with the program code thereby implementing the functions of any embodiment described above.

Note that the present invention is not limited to the details of the embodiments described above, but various modifications (including combinations of embodiments) are possible without departing from the spirit and the scope of the present invention. While the present invention has been described with reference to specific embodiments and examples, it is to be understood that the invention is not limited to specific structures or configurations disclosed therein. It will be apparent to those skilled in the art that various modifications are possible without departing from the spirit and scope of the invention.

According to embodiments of the invention, as described above, when a vacant block is created as a result of deleting an object in document information, another proper object that provides consistency with the original document information is selected based on a user property and put in the vacant block. The resultant document information is presented to another user.

Note again that while the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-187118 filed Jul. 18, 2008, which is hereby incorporated by reference herein in its entirety.

What is claimed is:

1. An information processing apparatus for outputting document information different from original document information for each access user, the information processing apparatus comprising:
   a management unit configured to acquire a property of a partial area included in document information and manage the partial area in connection with the property as an object;
   an acquisition unit configured to acquire a user property of an access user accessing the document information;
   a deleting unit configured to compare the user property acquired by the acquisition unit with the property of the object managed by the management unit, and delete, from the document information, an object that is not allowed to be accessed by a user having the user property;
   a search unit configured to search for an object with which to replace the deleted object deleted by the deleting unit, based on properties of objects present in the neighborhood of the deleted object in the document information managed by the management unit, wherein the objects present in the neighborhood of the deleted object remain and undeleted objects in the document information are adjusted by an adjustment unit;
   the adjustment unit configured to adjust, if the object with which to replace the deleted object is retrieved by the search unit, a layout of the document information using the retrieved object; and
   an output unit configured to output, for the access user, the document information having the layout adjusted by the adjustment unit,
   wherein the adjustment unit adjusts the layout of the document information such that when the object with which to replace the object deleted by the deleting unit is not found by the search unit, a blank area created in the document information as a result of deleting the object by the deleting unit is filled with the objects present in the neighborhood of the object deleted by the deleting unit.

2. The information processing apparatus according to claim 1, wherein the adjustment unit adjusts the layout of the document information such that when a blank area is created in the document information as a result of deleting the object by the deleting unit, the adjustment unit changes the size of the object retrieved by the search unit and puts the resultant object with the changed size in the blank area.

3. The information processing apparatus according to claim 1, wherein the property of the object includes feature information of the object and information indicating a type, size, and a location of the object.

4. The information processing apparatus according to claim 1, wherein the property of the object includes information indicating a result of recognition of information present in the neighborhood of the deleted object.

5. The information processing apparatus according to claim 1, wherein the output unit outputs both document information with the layout adjusted by the adjustment unit and document information in an unadjusted state.

6. A method for outputting document information different from original document information for each access user of an information processing apparatus, comprising the steps of:
   acquiring a property of a partial area included in document information and managing the partial area in connection with the property as an object;
   acquiring a user property of an access user accessing the document information;
   comparing the user property acquired in the acquisition step with the property of the object managed in the management step, and deleting, from the document information, an object that is not allowed to be accessed by a user having the user property;
   searching for an object with which to replace the deleted object deleted in the deleting step, based on properties of objects present in the neighborhood of the deleted object in the document information managed in the managing step, wherein the objects present in the neighborhood of the deleted object remain and undeleted objects in the document information are adjusted;
   adjusting, if the object with which to replace the deleted object is retrieved, a layout of the document information using the retrieved object; and
   outputting, for the access user, the document information having the layout adjusted,
   wherein adjusting the layout of the document information such that when the object with which to replace the object deleted is not found by the search, a blank area created in the document information as a result of deleting the object is filled with the objects present in the neighborhood of the object deleted.

7. The method according to claim 6, wherein in the adjustment step, the layout of the document information is adjusted such that when a blank area is created in the document information as a result of deleting the object in the deleting step, the size of the object retrieved in the searching step is changed and the resultant object with the changed size is put in the blank area.

8. The method according to claim 6, wherein the property of the object includes feature information of the object and information indicating a type, size, and a location of the object.

9. The method according to claim 6, wherein the property of the object includes information indicating a result of recognition of information present in the neighborhood of the deleted object.

10. The method according to claim 6, wherein in the outputting step, both document information with the layout adjusted in the adjustment step and document information in an unadjusted state are output.

11. A non-transitory computer-readable storage medium in which a program configured to be executed by a computer to implement a method of managing document information for outputting document information different from original document information for each access user of an information processing apparatus, the method comprising the steps of:

acquiring a property of a partial area included in document information and managing the partial area in connection with the property as an object;

acquiring a user property of an access user accessing the document information;

comparing the user property acquired in the acquisition step with the property of the object managed in the management step, and deleting, from the document information, an object that is not allowed to be accessed by a user having the user property;

searching for an object with which to replace the deleted object deleted in the deleting step, based on properties of objects present in the neighborhood of the deleted object in the document information managed in the managing step, wherein the objects present in the neighborhood of the deleted object remain and undeleted objects in the document information are adjusted;

adjusting, if the object with which to replace the deleted object is retrieved, a layout of the document information using the retrieved object; and outputting, for the access user, the document information having the layout adjusted, wherein adjusting the layout of the document information such that when the object with which to replace the object deleted is not found by the search, a blank area created in the document information as a result of deleting the object is filled with the objects present in the neighborhood of the object deleted.

\* \* \* \* \*